US010866882B2

(12) United States Patent
Karmon et al.

(10) Patent No.: US 10,866,882 B2
(45) Date of Patent: Dec. 15, 2020

(54) DEBUGGING TOOL

(71) Applicant: Microsoft Technology Licensing, LLC, Redmond, WA (US)

(72) Inventors: Kfir Karmon, Cambridge (GB); Yuval Tzairi, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

(21) Appl. No.: 15/638,350

(22) Filed: Jun. 29, 2017

(65) Prior Publication Data

US 2018/0307587 A1    Oct. 25, 2018

(30) Foreign Application Priority Data

Apr. 20, 2017    (GB) .................................. 1706300.9

(51) Int. Cl.

| G06F 11/36 | (2006.01) |
|---|---|
| G06F 3/01 | (2006.01) |
| G06F 11/32 | (2006.01) |
| G06F 9/448 | (2018.01) |
| G06F 11/28 | (2006.01) |
| G06F 3/0484 | (2013.01) |

(52) U.S. Cl.
CPC .......... *G06F 11/3664* (2013.01); *G06F 3/017* (2013.01); *G06F 3/04845* (2013.01); *G06F 11/323* (2013.01); *G06F 11/3624* (2013.01); *G06F 11/3648* (2013.01); *G06F 9/4498* (2018.02); *G06F 11/28* (2013.01)

(58) Field of Classification Search
CPC .......... G06F 11/36; G06F 3/017; G06F 11/28; G06F 11/3664; G06F 3/04845; G06F 11/323; G06F 11/3624; G06F 11/3648; G06F 9/4498
See application file for complete search history.

(56) References Cited

U.S. PATENT DOCUMENTS

| 5,793,948 A | 8/1998 | Asahi et al. |
|---|---|---|
| 8,499,287 B2 | 7/2013 | Shafi et al. |
| 8,526,767 B2 * | 9/2013 | Bowens ................ G06F 3/0445 382/315 |

(Continued)

OTHER PUBLICATIONS

Hao Lü et al., "Gesture Coder: A Tool for Programming Multi-Touch Gestures by Demonstration", [Online], pp. 2875-2884, [Retrieved from Internet on Aug. 1, 2020], <https://dl.acm.org/doi/pdf/10.1145/2207676.2208693> (Year: 2012).*

(Continued)

*Primary Examiner* — Ziaul A Chowdhury

(57) ABSTRACT

A debugging tool comprises user input apparatus to receive user input from a debugging user, computer storage configured to hold a piece of code to be debugged, the code embodying a state machine defining a user input action, a display configured to display a timeline, and at least one processor configured to execute an iterative debugging process for visualising behaviour of the code on the timeline. The debugging process is driven by changes in the user input received at the user input apparatus and is performed so as to represent on the timeline a sequence of expected user input states of the state machine as they are actualized by the debugging user according to the permitted transitions.

20 Claims, 16 Drawing Sheets

(56) References Cited

U.S. PATENT DOCUMENTS

| | | | |
|---|---|---|---|
| 8,601,444 B2 | 12/2013 | Shafi | |
| 8,666,925 B1* | 3/2014 | Barford | G06F 9/4498 706/48 |
| 8,782,611 B1 | 7/2014 | Kretzler et al. | |
| 9,154,611 B1* | 10/2015 | Jackson | H04W 4/029 |
| 2003/0065505 A1* | 4/2003 | Johnston | G06F 3/0481 704/9 |
| 2004/0015744 A1* | 1/2004 | Klotz | G06F 11/3414 714/43 |
| 2008/0229276 A1* | 9/2008 | Koehler | G06F 8/35 717/104 |
| 2010/0318852 A1 | 12/2010 | Zheng et al. | |
| 2011/0115702 A1* | 5/2011 | Seaberg | G06F 3/0485 345/156 |
| 2011/0179387 A1* | 7/2011 | Shaffer | G06F 9/542 715/835 |
| 2011/0283239 A1 | 11/2011 | Krishnan et al. | |
| 2012/0133579 A1* | 5/2012 | Prieur | G06F 3/017 345/156 |
| 2012/0204155 A1* | 8/2012 | Ben-Artzi | G06F 11/3688 717/125 |
| 2013/0305248 A1* | 11/2013 | Nikara | G06F 1/1643 718/100 |
| 2013/0346817 A1* | 12/2013 | Maier | G05B 19/045 714/727 |
| 2014/0115566 A1* | 4/2014 | Cao | G06F 9/4498 717/129 |
| 2015/0033172 A1 | 1/2015 | Krajec | |
| 2015/0186004 A1* | 7/2015 | Gordon | G01C 21/367 345/173 |
| 2015/0220153 A1 | 8/2015 | Aliseychik et al. | |
| 2015/0261659 A1* | 9/2015 | Bader | G06F 11/3688 717/125 |
| 2016/0011769 A1* | 1/2016 | Zou | G06F 3/04845 715/863 |
| 2016/0196198 A1* | 7/2016 | Ajith Kumar | G06F 11/3495 714/45 |
| 2017/0132024 A1* | 5/2017 | Desineni | G06F 8/61 |
| 2017/0277521 A1* | 9/2017 | Sharma | G06F 9/4498 |
| 2018/0267784 A1* | 9/2018 | Wang | G06F 8/433 |
| 2018/0335922 A1* | 11/2018 | Nilo | G06F 3/04845 |

OTHER PUBLICATIONS

Wen-Hui Chen et al., "A Generic Framework for the Design of Visual-based Gesture Control Interface", [Online], pp. 1522-1525, [Retrieved from Interent on Aug. 1, 2020],<https://ieeexplore.ieee.org/stamp/stamp.jsp?arnumber=5514676> (Year: 2010).*

Michael DiMartino, "A Statistical Hand Gesture Recognition System Using the Leap Motion Controller", [OnLine], pp. 1-44, [Retrieved from Internet Aug. 1, 2020] <http://scholarworks.csun.edu/bitstream/handle/10211.3/171810/Dimartino-Michael-thesis-2016.pdf> (Year: 2016).*

"Vampir—Performance Data Visualization", https://www.vampir.eu/tutorial/manual/performance_data_visualization, Retrieved on: Feb. 15, 2017, 20 pages.

Isaacs, et al., "Combing the Communication Hairball: Visualizing Parallel Execution Traces using Logical Time", In Journal of IEEE Transactions on Visualization and Computer Graphics, vol. 20, Issue 12, Dec. 31, 2014, 10 pages.

Hong, et al., "Gesture Modeling and Recognition Using Finite State Machines", In Proceedings of Fourth IEEE International Conference on Automatic Face and Gesture Recognition, Mar. 30, 2000, pp. 1-6.

Petropoulos, Angelos, "IntelliTrace in Visual Studio Ultimate 2015", https://blogs.msdn.microsoft.com/visualstudioalm/2015/01/16/intellitrace-in-visual-studio-ultimate-2015/, Published on: Jan. 16, 2015, 12 pages.

Banerjee, Sarthak, "Splunk Timeline—Visualizing the inherent parallelism of your system", http://sarthakbanerjee.blogspot.in/2016/06/splunk-timeline-visualizing-inherent.html, Published on: Jun. 20, 2016, 3 pages.

* cited by examiner

```
public HandPose CreateIndexThumbPointPose(string name, RelativePlacement indexThumbRelation)
{
    return new HandPose(name, new FingerPose[]{ new FingerPose( finger.Index, finger.Thumb ), FingerFlexion.Open, PoseDirection.Forward),
        new FingerTipDistanceRelation(finger.Index, RelativeDistance.NotTouching, finger.Thumb),
        new FingerTipPlacementRelation(finger.Index, indexThumbRelation, finger.Thumb));
} public Gesture CreateRotateResture(string name)
{
    return new Gesture(name, CreateIndexThumbPointPose("LockObjectPose", RelativePlacement.Above),
        CreateIndexThumbPointPose("RotateRightPose", RelativePlacement.Right));
}
```

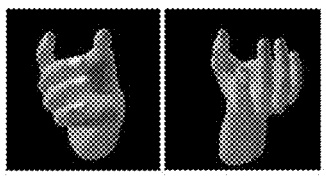

FIG. 1C

```
<Gesture Name="RotateGesture" xmlns="http://schemas.microsoft.com/moriah/2015/xaml">
  <Gesture.Segments>
    <IdleGestureSegment Name="Idle" />
    <HandPose Name="LockObjectPose">
      <FingerPose Context="Index, Thumb" Direction="Forward" Flexion="Open" />
      <FingertipDistanceRelation Context="Index" DistanceRelation="NotTouching" OtherContext="Thumb" />
      <FingertipPlacementRelation Context="Index" PlacementRelation="Above" OtherContext="Thumb" />
    </HandPose>
    <HandPose Name="RotateRightPose">
      <FingerPose Context="Index, Thumb" Direction="Forward" Flexion="Open" />
      <FingertipDistanceRelation Context="Index" DistanceRelation="NotTouching" OtherContext="Thumb" />
      <FingertipPlacementRelation Context="Index" PlacementRelation="Right" OtherContext="Thumb" />
    </HandPose>
  </Gesture.Segments>
  <Gesture.SegmentsConnections>
    <SegmentConnections From="Idle" To="Idle, LockObjectPose" />
    <SegmentConnections From="LockObjectPose" To="RotateRightPose" />
    <SegmentConnections From="RotateRightPose" To="Idle" />
  </Gesture.SegmentsConnections>
</Gesture>
```

FIG. 1D

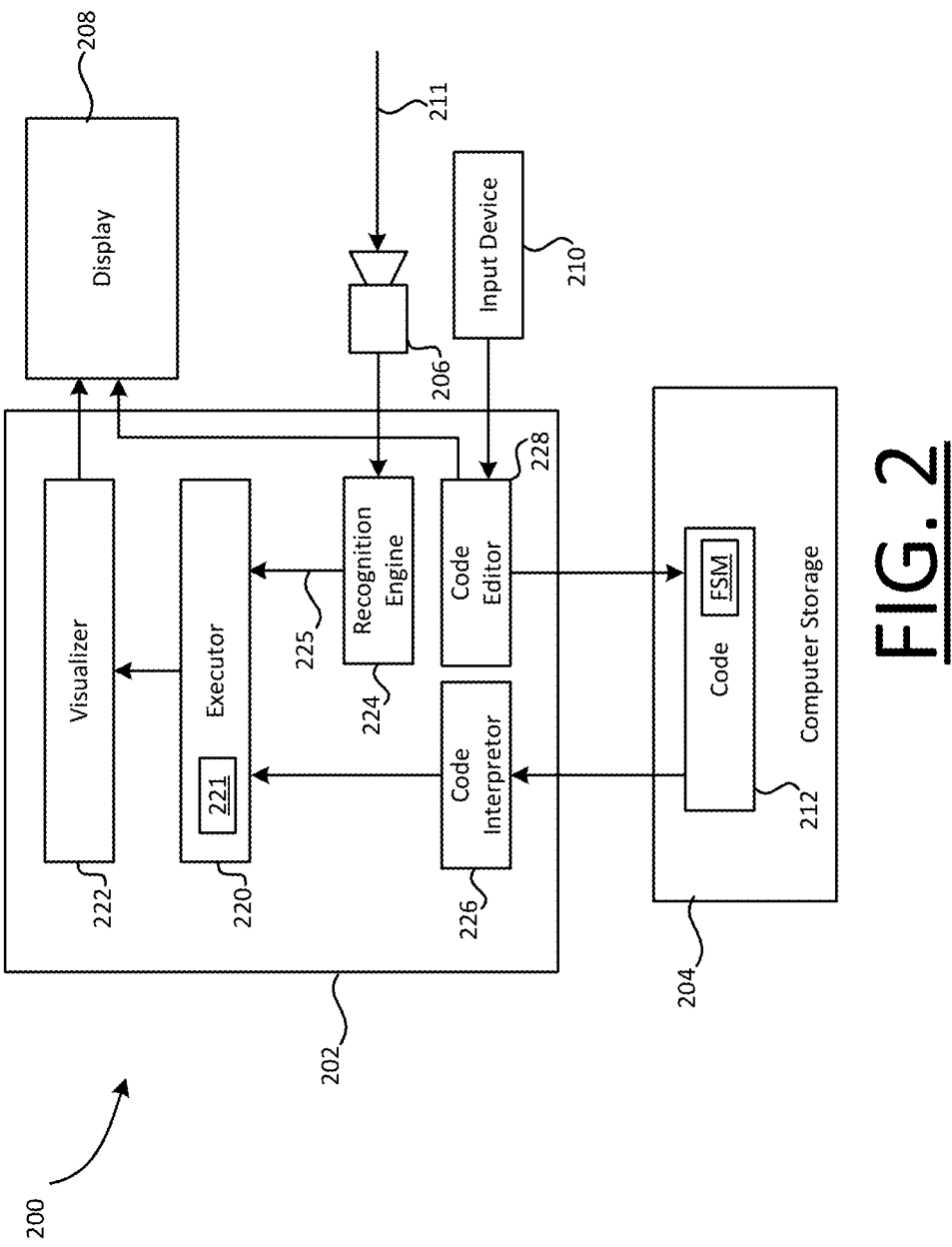

(intended state machine)

(coded state machine)

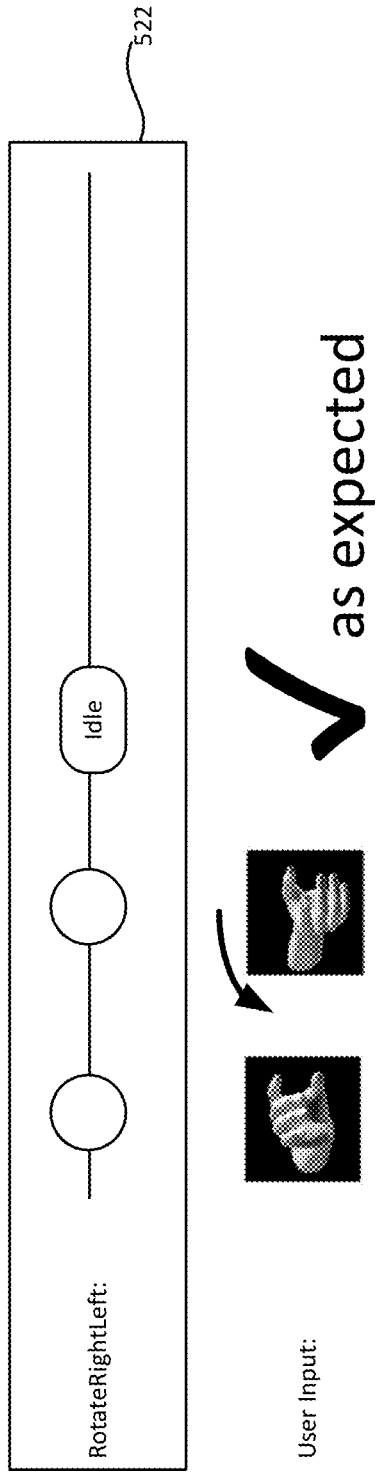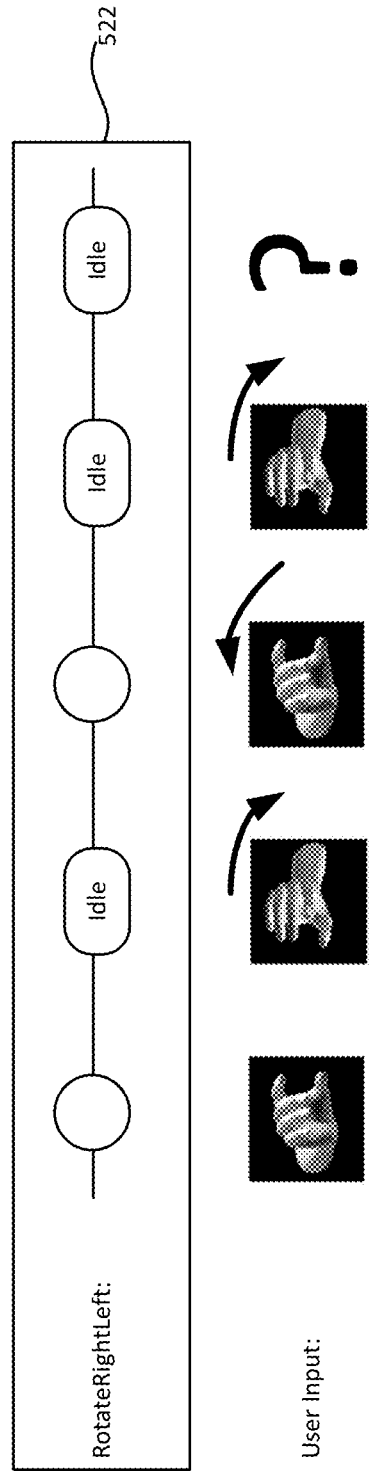
FIG 5C
FIG 5D

DEBUGGING TOOL

CROSS-REFERENCE TO RELATED APPLICATION

This application claims priority to GB application serial number 1706300.9, filed Apr. 20, 2017, the entirety of which is hereby incorporated by reference herein.

TECHNICAL FIELD

The present invention relates to a tool for visually debugging a piece of code, for example a piece of code denoting a user experience flow/model.

BACKGROUND

A user interface (UI) refers to a mechanism by which a user and a computer can interact with one another. The purpose of a so-called natural user interface (NUI) is to allow a user to interact with a device in a "natural" manner, free from artificial constraints imposed by certain input devices such as mice, keyboards, remote controls, and the like. Examples of NUI methods include those utilizing "free-space" motion gesture detection using cameras (such as stereoscopic or time-of-flight camera systems, infrared camera systems, RGB camera systems etc.), accelerometers/gyroscopes or other motion sensors, etc.; voice and speech recognition; intention and goal understanding; touch sensitive displays, particularly when combined with gesture recognition whereby the user can make (single or multi-touch gestures) on the touchscreen; gaze tracking etc.

With regards to free-space gesture recognition, although there has been significant research in this area, many of the gesture recognition solutions have various drawbacks.

Broadly speaking, the most widely adopted gesture recognition techniques that are available today fall into one of two categories. In both cases, the aim is to allow an application developer to incorporate gesture recognition into his application. That is, it is left to the developer to decide which application functions should be triggered by which gestures.

The first approach seeks to maximize flexibility, by providing a full frame-by-frame description of, say, a user's hand. For example by generating a model of the user's hand (e.g. a set of skeletal points), which is updated frame-by-frame as the user moves his hand. In this case, if a developer wishes to incorporate gesture recognition into an application, it is down to him to define gestures in terms of conditions relating to the hand model parameters. Not only is this a burden for the developer, but such frame-by-frame modelling can be quite unreliable, resulting in undesired behaviour that is detrimental to the end-user's experience.

The second approach is more or less the opposite: a set of predefined gestures is decided early, and a gesture recognition system is trained to recognize that set of gestures using machine learning techniques. To achieve reliable recognition, extensive offline training is needed, which in turn requires significant time and resources. Hence, this approach is only viable for small number of predetermined gestures. Although this generally provides more reliable gesture detection, the developer's freedom is limited: he (including she) can choose which application functions are triggered by which of these predefined gestures, but the system does not allow him to define his own gestures or modify existing gestures at all. The only way to add new gestures is to train the system to recognize them from scratch.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In contrast to the techniques outlines above, the present invention relates to a system in which a user input action, such as a gesture, is defined by a (finite) state machine (FSM). A state machine defining a user input action has a set of states (expected user input states), each of which is associated with a set of one or more constraints, and a set of permitted transitions between those states. Transitions between the states of the state machine are driven by changes in a user input received at user input apparatus, wherein an application function is triggered upon reaching an accepting state of the state machine. The state machine will only transition from a current one of the states to a new one of the states if:

whilst in the current state, the user input changes so that it now matches the new state; that is, such that the user input meets the set of constraints associated with the new state, and a transition from the current state to the new state is permitted.

Thus, in order to reach an accepting state, the user input must not only exhibit certain changes but may have to do so in a certain order, as dictated by the user input states and the permitted transitions between them respectively.

In the case of gestures, as explained in greater detail below, each of the states can correspond to a particular hand pose or hand motion. However, in order to transition to one of these states, not only must the user make a matching pose or hand motion, but there must also exist a valid transition from the current state to that state. This means that, in order to reach an accepting state, it may be that the user not only has to make specific hand poses or hand motions but must also do so in a specific order.

The present invention relates specifically to a debugging tool that allows a debugging user to analyze the behaviour of a piece of code embodying such a state machine, and in particular to identify errors in the code—such as missing or incorrectly defined transitions or user input states—in an intuitive manner.

A first aspect of the present invention is directed to a debugging tool comprising: user input apparatus configured to receive user input from a debugging user; computer storage configured to hold a piece of code to be debugged, the code embodying a state machine defining a user input action, wherein the state machine has a set of expected user input states for the user input action and a set of permitted transitions between the user input states, whereby the user input action is performed by a user actualizing a sequence of the expected user input states according to the permitted transitions; a display configured to display a timeline; and at least one processor configured to execute an iterative debugging process for visualising behaviour of the code on the timeline, the debugging process being driven by changes in the user input received at the user input apparatus. An initial iteration of the debugging process is performed for a starting state of the expected user input states as follows:

1) identifying one or more of the expected user input states of the state machine to which there is a permitted transition from the starting state,
2) comparing the changing user input to the identified state(s), and
3) if a match between the user input and one of the identified state(s) is detected: 3a) controlling the display to add a visual representation of the matching state to the displayed timeline, and 3b) performing a further iteration of the debugging process for the matching state, thereby representing on the timeline a sequence of the expected user input states as they are actualized by the debugging user according to the permitted transitions.

In other words, each time the user input changes so as to cause the state machine to change state, a visual representation of the new state is added to the timeline. This provides an intuitive way for a debugging user to understand the behaviour of the coded state machine, and identify in particular when the state machine is not behaving as expected due to errors in the code, such as missing or wrongly-defined states or transitions, such that state changes are not being triggered as expected.

Note that the term "piece of code embodying a state machine" is used in a broad sense to mean any computer-readable representation of a state machine. In particular, the term "code" is not limited to the context of imperative programming (such as C # or similar), and the code embodying the state machine can for example be a piece of declarative code, such as XAML.

In embodiments, the code may embody multiple state machines each defining a different user input action, wherein respective timelines are displayed for each of the user input actions and the debugging process is performed for each of the user input actions simultaneously, whereby one change in the user input can cause visual state representations to be added to multiple timelines.

An identifier of each of the user input actions may be displayed in association with the timeline displayed for that user input action.

At least one of the user input states of the state machine may be an accepting state, the user input action being completed by reaching an accepting state, wherein the visual representation of the accepting state marks it as an accepting state.

The processor may be configured to control the display to indicate to the user a detected change in the user input even if: the changed user input does not match one of the expected user input states of the state machine, or the changed user input does match one of the expected user input states but there is no permitted transition to that state from the user input state for which a current iteration of the debugging process is being performed, whereby the user can see the change in the user input has been detected correctly and thereby infer that a discrepancy in the sequence of states on the timeline is due to the behaviour of the code being debugged.

The processor may be configured to control the display indicate to the user the most recently detected state by displaying information about the most recently detected state in an area of the display separate from the timeline.

The information may comprise a description of the most recently detected state and/or a visual representation of the most recently detected state.

If the processor detects a match between the changed user input and any one of the expected states but there is no permitted transition to that state from the user input state for which a current iteration of the debugging process is being performed, such that no visual representation of the matching state is added to the timeline in response to the change in the user input, the processor may be configured indicate the detected match to the user in an area of the display separate from the timeline, whereby the user can see the match has been detected and infer the absence of any such permitted transition from the absence of any such visual representation of the matching state on the timeline.

A representation of an idle state of the state machine may be added to the timeline in response to the change in the user input.

The starting state may be an idle state, and the state machine may be configured to return to the idle state from any of the user input states if no state change occurs within a time limit or if the user input changes in a way that does not match any expected user input state to which transitions are permitted from the user input state for which a current iteration of the debugging process is being performed; wherein if no match detected at step 3) within the time limit, a visual representation of the idle state may be added to the timeline to convey the return to the idle state.

The processor may be configured to display, for a target one of the expected user input states: an indication of one or more constraints that must be met by the user input to match that state together with an indication of whether those constrains are currently met by the user input, and/or information about any of the expected user input states to which transitions are permitted from the target state, and/or information about any of the expected user input states from which transition are permitted to the target state.

The processor may be configured to receive an input from the user to select the target state.

At least one of the visual representations on the timeline may be selectable to obtain additional information about the state it represents.

At least one of the visual representations on the timeline may be selectable to select, as the target state, the state it represents.

At least one of the visual representations may identify a modality of the state it represents.

A second aspect of the present invention is directed to method of debugging a piece of code comprising: executing, by a debugging tool, an iterative debugging process for visualising behaviour of the code on a timeline, the debugging process being driven by changes in the user input received at the user input apparatus; wherein the code embodies a state machine defining a user input action, wherein the state machine has a set of expected user input states for the user input action and a set of permitted transitions between the user input states, whereby the user input action is performed by a user actualizing a sequence of the expected user input states according to the permitted transitions; wherein an initial iteration of the debugging process is performed by the debugging tool for a starting state of the expected user input states as follows: 1) identifying one or more of the expected user input states of the state machine to which there is a permitted transition from the starting state, 2) comparing the changing user input to the identified state(s), and 3) if a match between the user input and one of the identified state(s) is detected: 3a) controlling a display to add a visual representation of the matching state to a timeline displayed by the display, and 3b) performing a further iteration of the debugging process for the matching state, thereby representing on the timeline a sequence of the expected user input states as they are actualized by the debugging user according to the permitted transitions.

In embodiments, any feature of the first aspect or any embodiment thereof may be implemented.

A third aspect of the present invention is directed to a method comprising using the debugging tool of the first aspect or the debugging method of the second aspect to identify an error in a piece of code, and modifying the code to correct the error.

The method may comprise a step of executing the state machine embodied by the modified code, wherein the executed state machine causes an application function to be performed upon reaching an accepting state of the executed state machine.

The method may further comprise a step of incorporating the modified code in an executable application, in which the user input action is associated with an application function, wherein the user input action, when performed, causes the application to perform the application function at runtime.

A fourth aspect of the present invention is directed to a computer program product for debugging a piece of code, the computer program product comprising computer readable instructions stored on a computer readable storage medium and configured to cause a processor to implement the method of the second aspect, or any embodiment thereof.

BRIEF DESCRIPTION OF FIGURES

For a better understanding of the present invention, and to show how embodiments of the same may be carried into effect, reference is made to the following figures in which:

FIGS. 1C and 1D show examples of how the state machine of FIG. 1B may be coded in C # and XAML respectively;

FIG. 2 shows a highly schematic block diagram for a debugging tool;

FIGS. 5C-E show examples of a timeline for the Rotate Right/Left gesture, illustrating how those timelines may be updated in response to changing user input in a manner that allows the error in the state machine to be discovered;

DETAILED DESCRIPTION OF EMBODIMENTS

Figure 1A:
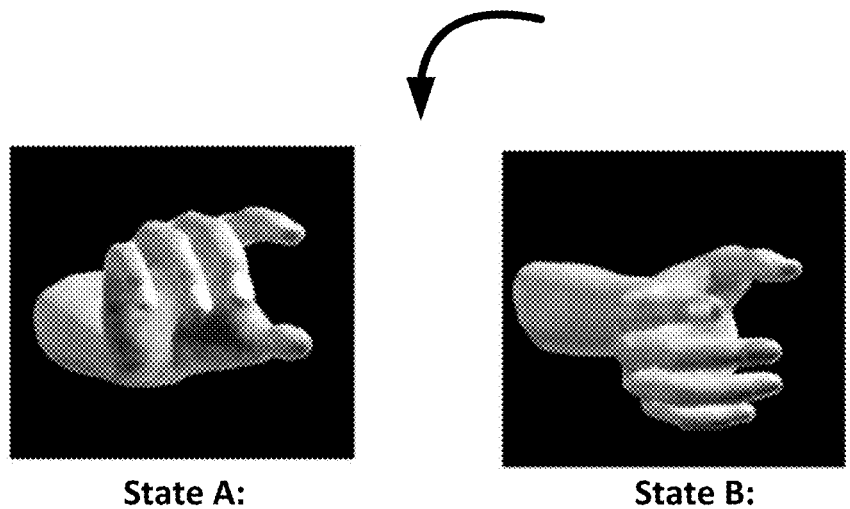
FIG. 1A shows an example of a simple "Rotate Right" gesture.

Embodiments of the present invention will now be described by way of example only.

In contrast to the known techniques outline above, in the present context a very different approach to gesture recognition is adopted. Although this does use machine learning, rather than providing a set of predetermined gestures that a recognition engine is trained to recognize, the engine is—to put it in very high level terms—essentially trained to describe characteristics of a users hand in qualitative, natural language terms.

For example, the system described below is trained to recognize when specific fingers are and are not touching (finger tangency, or equivalently "fingertip placement relation"), the "canonical" direction (up, down, left, right, forward, backward) in which a finger is pointing, the relative position of two fingers in such canonical terms (fingertip placement relation), and whether or not a particular finger is folded (finger flexion). It is also trained to recognize the canonical direction the palm of the hand is facing (palm direction) and the palm orientation, again in canonical terms.

To put it in more formal terms, rather than learning predefined gestures, the described system is trained to assign truth values to a set of predetermined, basic propositions—such as 'the index and middle fingers are not touching'—where each of the propositions is obtained by applying one-argument predicates ("direction" and "flexion") or two-argument predicates ("relative direction" and "tangency") to one or two of six interest points in the hand (the five fingertips and the palm centre).

The recognition engine can also be trained to recognize a predetermined set of hand motion in any of the canonical directions, i.e. movement to the left, right, up, down, forwards or backwards. Similarly, in formal terms, this can be formulated as assigning a truth value to six canonical motion propositions, namely 'the hand is moving Right/Left/forwards/backwards/up/down'.

With this approach, the application developer has a significant freedom to define custom gestures that can be detected accurately. The gesture is defined as a state machine, for which the developer specifies, in his code, a set of states and a set of permitted transitions between those states as he desires, i.e. he specifies which transitions between those states are permitted. The developer also associates each state with one or more of the predetermined propositions (in any desired combination). The set of propositions constitutes a set of conditions that must be satisfied by a received user input in order for the state machine to enter that state. Thus, in order for the state machine to enter a new state from a current state:

the user input must satisfy the constraints associated with the new state, and a transition from the current state to the new state must be permitted.

A change in the user input changes that causes a change in the state of the state machine is referred to as a "triggering event".

The developer is also free to designate one or more of the states as accepting states, an accepting state being a state wherein an application function is triggered in response to the state machine entering that state (possibly subject to other constraints, such as the state machine remaining in that state for a certain interval of time etc.).

By way of example, FIG. 1A shows a simple rotate gesture, whereby the user begins with the palm of his right hand facing forward and the index finger of his left hand above his thumb, and rotates his hand clockwise (from his perspective) by about 90 degrees to trigger an application function ("Rotate Right" gesture).

Figure 1B:
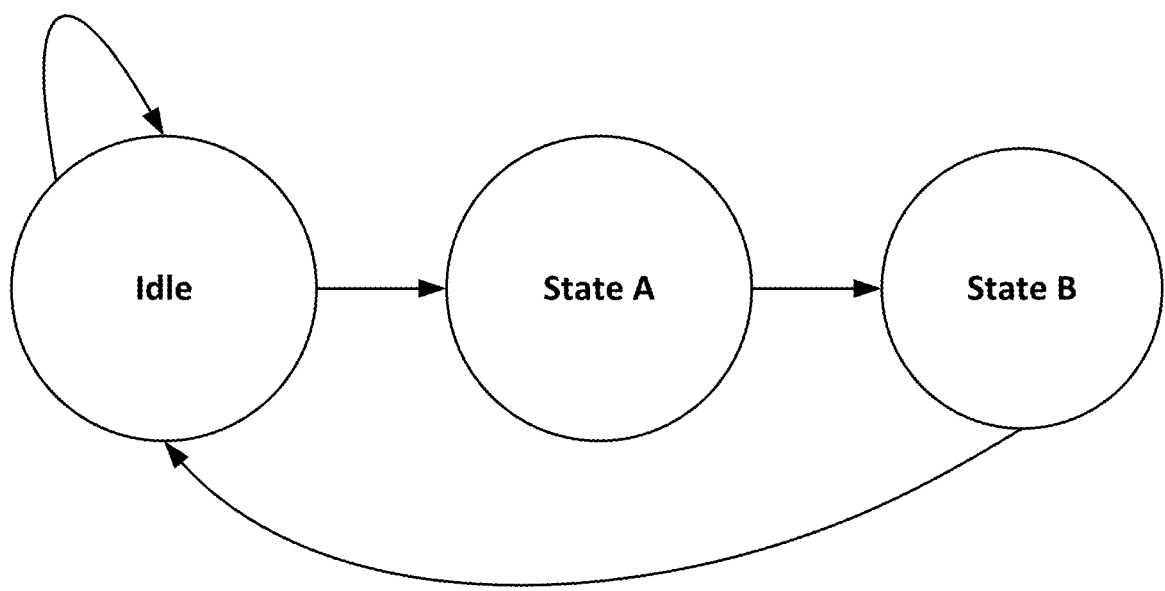
FIG. 1B shows how the gesture may be defined as a state machine.

The Rotate Right gesture can be defined using two static poses: a starting pose with the index above the thumb, and a finishing pose with the index right of the thumb (from the user's perspective). This can be defined by a simple state machine as shown in FIG. 1B. That is, a state machine that is:
  initially in an Idle state,
  which transitions from the idle state to State A if and when the recognition engine detects, whilst in the idle state, that the conditions associated with State A are satisfied. This requires the following six propositions to be true:
    the flexion of the index is open,
    the flexion of the thumb is open,
    the index is pointing forward,
    the thumb is point forward,
    the index finger and thumb are not touching,
    the index finger is above the thumb;
  which transitions from State A to State B if and when the recognition engine detects, whilst in State A, that the conditions associated with State B are now satisfied, requires the following six propositions to be true:
    the flexion of the index is open,
    the flexion of the thumb is open,
    the index is pointing forward,
    the thumb is point forward,
    the index finger and thumb are not touching,
    the index finger is to the right of the thumb;
  for which State B is an "accepting state" in that an application function is triggered at runtime by the state machine in State B—this can be any application function chosen by the developer. This is denoted by the transition from State B back to Idle, denoting the fact that as the action is performed the state machine reverts to idle.

To perform the Rotate Right gesture, the user therefore begins with his palm facing forward and his index finger above his thumb (thereby actualizing State A), and then rotates his hand clockwise from his perspective so that his index is now to the right of his thumb (thereby actualizing State B, to which a state machine transition is permitted from State A).

For conciseness, any state to which a transition from a given state is permitted is called a "child" of the given state herein; conversely, any state from which a transition to a given state is permitted is called a "parent" of the given state. In this example, State A is therefore a parent of State B, and State B is a child of State A. State A is both a child and a parent of Idle, and vice versa. In this terminology, a state machine can only transition from a current state to a new state if the new state is a child of the current state (or, equivalently, if the current state is a parent of the new state).

Note: a default behaviour may be imposed, whereby the state machine revers back to idle from a non-accepting state if no other transition occurs in time, or if the actual user input changes in a way that does not match any child of the current state (possibly with a grace interval of e.g. ~500 ms). In contrast to the transition back to Idle from an accepting state, this occurs without triggering an application function. In the implementations described below, this default behaviour does not need to be defined explicitly by the developer and is not shown as a transition of the state machines in the figures. That is, in the figures, a transition from a given state back to Idle is only depicted when the given state is an accepting state. The time limit after which the state machine returns to Idle can be set by the developer, or a default time limit may be used that is implicit.

The application function may for example be the rotation of a displayed object. That is, the application function triggered by entering State B may be controlling a display to rotate an object displayed on the display. This is just an example, and the application function that is triggered can be anything of the developer's choosing, such as following a link or controlling an external device, such as an image capture device, audio output device etc. The application function is triggered at runtime (i.e. when the application is executed), once the code has been compiled and incorporated into the application. Note that, although the application function is triggered at runtime, it may not be triggered by entering the accepting state during the debugging process.

FIGS. 10 and 1D show examples of how the state machine of FIG. 1B can be embodied in a piece of C # code and a piece of XAML code respectively.

The C # code generates a Rotate Right gesture object. The two constituent poses are defined using a single method 'CreateIndexThumbPointPose( )' accepting the required index-to-thumb relation as input argument. "Rotate Right" is then defined as a short sequence of the two poses.

The XAML code applies the same propositions for the Rotate Right gesture, but defined in XAML format without the C # syntax.

To incorporate either piece of code into an application, it can be compiled, by a compiler, into machine code instructions for execution on a processor, such as a CPU(s). This can involve intermediate conversion, for example the XAML code may be automatically converted to C # code, which is then compiled in the usual manner. In practice, this may involve an intermediate assembly stage. This is just one approach, and others are equally viable. For example, within a framework that uses XAML as a serialization mechanism, an XAML string can simply be de-serialized in real-time, without requiring intermediate conversion. That is, converted directly to an in-memory data structure in order to execute the state machine, wherein the executed state machine triggers a user input action upon entering an accepting state. The process of complaining such code into an executable form is well known the art, and will not be discussed in further detail herein.

It is noted that, depending on the implementation, certain states and transitions may be defined implicitly in a piece of code. For example, the Idle state and transitions back to the Idle state if no other state change occurs in time may be implicit, and therefore do not need to be explicitly written into the code (though in other implementations they may be).

The Rotate Right gesture of FIGS. 1A-D is a simple example and, as will become evident, this approach can be used to define gestures of arbitrary complexity, by adding states and transitions. Each state can be associated with any desired combination of the predetermined propositions, and all the recognition engine needs to do is accurately determine a truth value for each of the individual predetermined propositions, which as noted can relate to hand pose or hand motion. Examples of more complex gestures and state machines are considered later.

In a system that defines gestures using a state machine it is important to allow the developer some insight on the detection process. The gesture detection in such systems is broken down to detecting transitions to consecutive states in the state machine until an accepting state is reached. These sequences might be interleaved with other sequences of gestures that are detected in parallel.

The following provides a timeline-based visual component that depicts the triggering events in a way that is clear and contextual. A user can see the events along a timeline in reference to other gestures that are co-triggering sequences. The triggering events are symbolized by different iconic images to depict different modality types of the triggering event. Different modalities are for example: Pose vs Motion vs Face vs Pen vs Touch etc. Each modality can be implemented as a deriving class of GestureSegment and could be a state in the Gesture's FSM. These will triggered detection events in the UI and would be symbolized with different icons for clarity.

FIG. 2 shows a schematic block diagram of a debugging tool 200, which is a computer device shown to comprise at least one processor 202 (such as a CPU or CPUs, e.g. in a multi-core processor), computer storage 204 accessible to the processor 202, and, coupled to the processor 202, user input apparatus 206, a display 208 and at least one input device 201, such as a keyboard and mouse/trackpad, touchscreen etc., for use by a developer in creating and modifying a piece of code 212 held in the computer storage 204.

As explained in greater detail below, the debugging tool 200 provides a visual mechanism by which a debugging user can debug the piece of code 212 in an interactive manner. That is, which allows the developer to see the behaviour of the code 212 in response to a changing user input 211 provided by the developer via the user input apparatus 206.

Various functional modules—namely an executor 220, a visualizer 222, a recognition engine 224, a code interpreter 226 and a code editor 228—are shown executed on the processor 202. These represent functionality that is implemented by the processor 202 to allow the developer to debug the code 212 held in the computer storage 204. This functionality is implemented by executable debugging instructions that are executed on the processor 202, with each of the functional modules 220-228 representing a different part of this functionality.

The code editor 288 receives coding input from the developer via the user input device 210 and creates and modifies the stored code 212 according to the received coding input. This may simply be a case of the developer entering the code as text, which he can freely edit. The text is displayed on the display 202, hence the code editor 228 is shown having an output connected to the display 208. The code 212 can be written in any suitable language, such as the C # and XAML examples given above, though these are not exhaustive. Alternatively, the code editor 228 may provide a visual editor, whereby the developer can build gestures by (say) manipulating a displayed model of a hand on the display 208 to specify individual poses of the gesture. In that case, the code editor 228 interprets inputs to the visual editor and generates the code 212 therefrom. In whatever language it is written, the code 212 embodies at least one state machine FSM, which defines a user input action in the manner outlined above. That is, the code can embody one state machine defining one user input action, or multiple state machines each defining a respective user input action.

In this example, the user input apparatus 206 comprises at least one image capture device (camera) for use in detecting free-space gestures. The user input 211 is visual information that is received by the recognition engine 224 as a sequence of captured image data from the camera. The recognition engine 224 processes the raw image data from the camera in order to determine the actual user input state 225.

The recognition engine 224 receives the user input 211 from the debugging user, in a debugging phase, and implements the functionality described above with regards to the received user input 211. That is, the recognition engine 224 determines and updates truth values for each of the set of basic propositions ('index finger is not touching thumb', 'palm is facing forward', 'hand is moving left' etc.) for the received user input as it changes due to the debugging user moving his hands, i.e. for each of the basic propositions, the recognition engine 224 determines whether the received input 211 currently satisfies that proposition. In other words, the recognition engine 224 determines a current state of the user input 212, where the current state is expressed in terms of the predetermined basic propositions that the recognition engine 224 has been trained, in advance, to understand. The current state of the user input 212 is labelled 225, and is referred to below as the actual user input state 225 to distinguish it from the expected user input states, i.e. the states of the state machine FSM defined by the code 212 such as Idle, State A and State B in FIG. 1B.

Note that although only the at least one processor 202 is shown as a single block in FIG. 2, the functionality of the debugging tool can be implemented in a distributed fashion. For example, the recognition engine 224 can be implemented as a remote service accessed via a network such as the internet. In this case, the captured image data (or information derived from it) can be transmitted to the remote service via the network, and results indicating the determined truth values are returned via the network.

The code interpreter 226 interprets the stored code 212, according to the language in which the code 212 is written. In particular, the code interpreter 226 is able to understand what states of the state machine are defined in the code 212 (i.e. the expected user input states), the respective constraints that must be met to enter those states, and what transitions between states are permitted by the code 212. Whilst the code interpreter 226 can for example comprise a compiler, which compiles the code 212 into executable machine instructions, for the purposes of debugging, it may not be necessary to compile the code in this sense. For example, it may be sufficient for the code interpreter 226 to simply parse the code 212 to determine the information needed to implement the debugging process described in detail below.

The executor 222, which is shown having inputs connected to outputs of the code interpreter 226 and recognition engine 224 respectively, executes the state machine embodied in the code 212, which is driven by the changes in the current state of the user input 225. In other words, it compares the actual user input state 225 with the states of the coded state machine FSM embodied, as interpreted by the code interpreter 226. This comparison in performed in order to determine whether a transition of the state machine (i.e. a state change) can take place.

The executor 220 keeps track of which state the executed state machine is currently in (221, FIG. 2). The executed state machine begins in the Idle state and, as indicated, can transition from a current one of its states (initially the Idle state) to a new one its states when (and only when):
   the actual user input state 225 matches the new state, and
   a transition from the current state to the new state is permitted, i.e. the new state is a child of the current state.

That is, a change in the received user input 221 that causes the executed state machine FSM to change state constitutes a triggering event only when both of the above apply. Accordingly no state change of the state machine FSM takes place in response to a change in the user input 211 if:

the changed user input 212 does not match any of the states of the state machine (i.e. the actual user input state 225 does not meet the constraints of any of the expected user input states of the state machine), or if the changed user input does 212 happen to match one of the states of the state machine, but a transition from the current state to that state is not permitted, i.e. it is not a valid transition for the state machine FSM.

Accordingly, in order to execute the state machine FSM, it is sufficient for the executor 220, each time the actual user input state 225 changes, to compare the following:

the actual user input state 225, with
any children of the current state of the state machine FSM.

The visualizer 222, shown having an input connected to an output of the executor 220, controls the display 208 to render a UI that provides an intuitive visual representation of these state changes as they occur. Each time a triggering event occurs, causing a visual representation of the new state is added to a timeline displayed on the display 208, so that over time the user can see not only what state machine transitions have occurred but also the order in which they have occurred. The triggering events are added to the timeline in real-time, so that as the user moves his hand or hands in front of the camera 206, thereby providing the changing user input 211 that drives transitions of the executed state machine, he can see those transitions on the display 208 as they occur in an intuitive manner. Accordingly, he can see when the executed state machine is not behaving as expected in response to the user input 211, and thereby identify errors in the code 212 and correct those errors by modifying the code 212.

In this manner, the state machine executor 220 and visualizer 222 cooperate to perform an iterative debugging process, in which a new iteration commences with each transition of the executed state machine. The "current" state refers to the state for which the current iteration is being performed, which in the above examples is the Idle state for the first iteration and, for the next iteration, whichever state the executed state machine FSM has transitioned to etc.

Figure 2A:
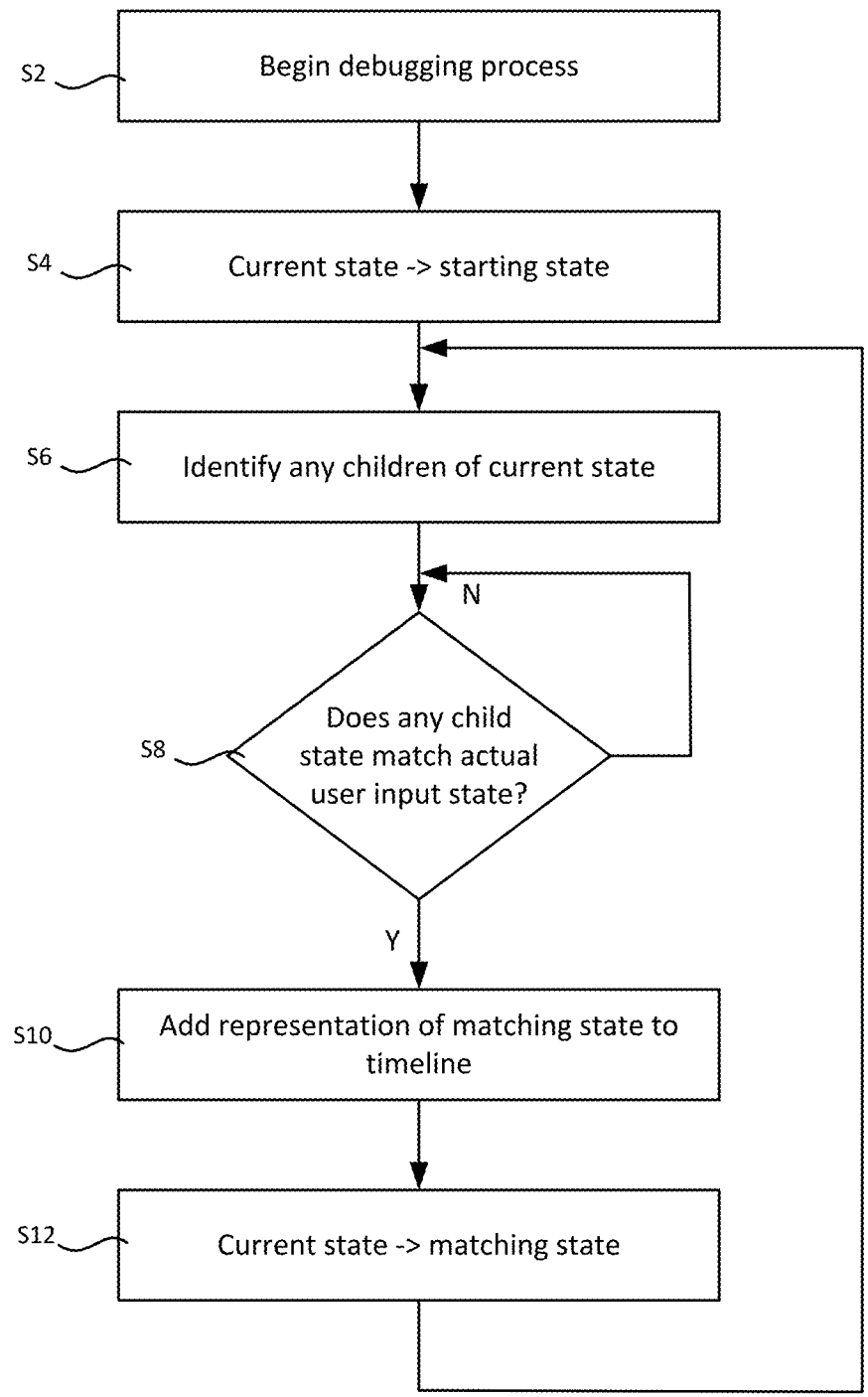
FIG. 2A shows a flow chart for an iterative debugging process.

This is illustrated in FIG. 2A, which shows a flowchart for the iterative debugging process applied to a state machine, which commences at step S2. In an initial iteration (S4), the current state is a starting state of the state machine, such as Idle. Any children of the current state are identified (S6) and compared with the actual user input state 225 as it changes to detect if and when any of the child states matches the actual user input state 225 (S8). This continues until a match is found. In response to detecting that one of the child states matches the actual user input state 225, which is a triggering event that causes the state machine to change to the matching state, a representation of the matching state is added to a timeline displayed for the state machine (S10) and the process repeats for the matching state (S12). That is, a further iteration of the debugging is performed for the matching state. The process continues until the user chooses to end it.

Figure 3:
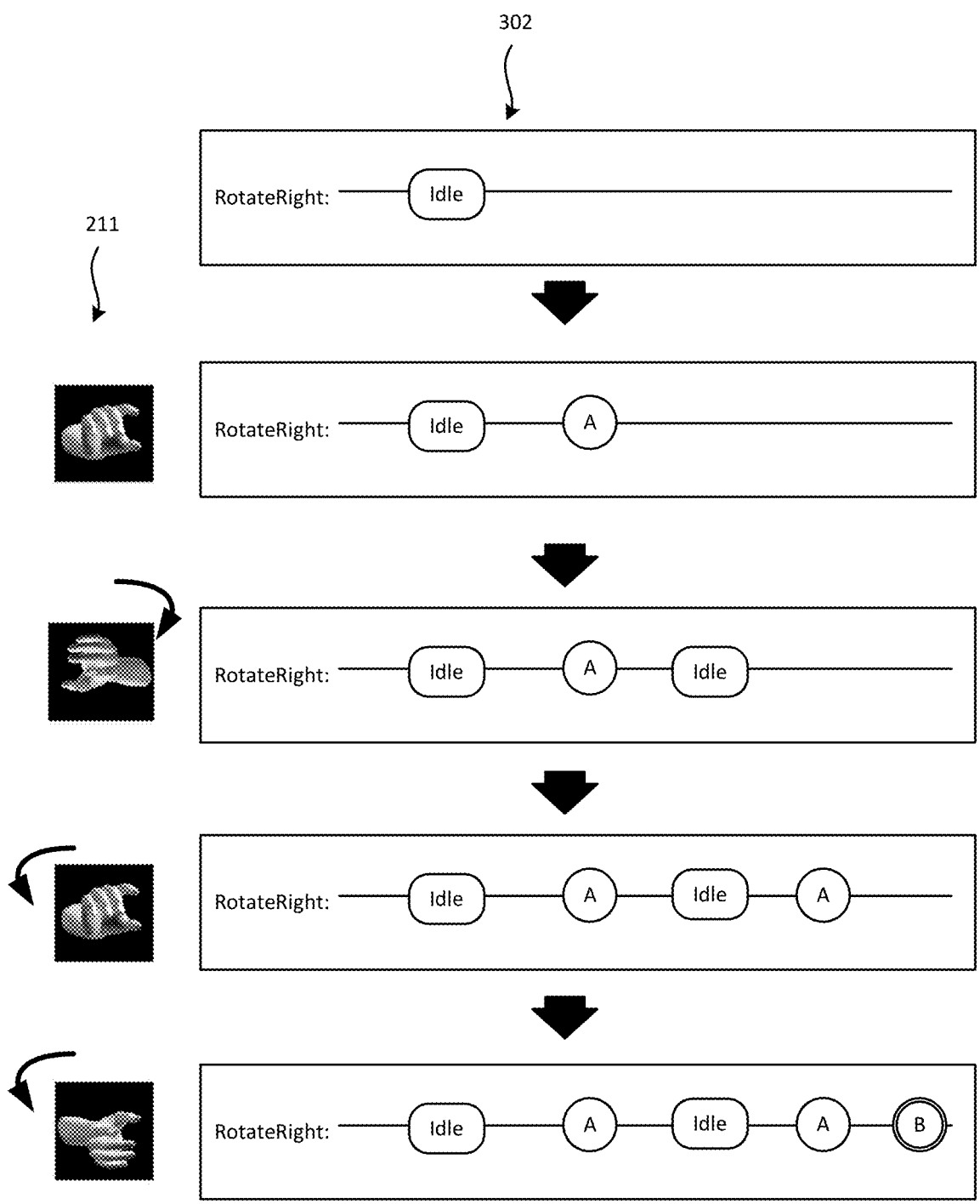
FIG. 3 shows an example of a timeline displayed by the debugging tool for the Rotate Right gesture as part of a user interface, and how the timeline may be updated over time in response to a changing user input in the form of hand motion.

To further aid illustration, FIG. 3 shows an example of how this can be applied to the Rotate Right gesture state machine of FIGS. 1A-D. On the left hand side, FIG. 3 shows an example of how the user input 211 may change over time as the user moves his hand (the axis of time running vertically down the page). The right hand side shows how a part of the UI comprising a timeline 302 for the Rotate Right gesture is updated in response.

Initially, the Rotate Right state machine begins in the Idle state and in this example this is represented explicitly on the Rotate Right timeline 302 (in other implementations, the initial Idle state may not be represented, such that the first state shown on the timeline is the first state the state machine enters from Idle).

Then, the user makes a hand gesture that matches State A, causing the executed state machine to transition from Idle to State A to Idle. In response, a visual representation of State A (icon) is added to the timeline 302, after the initial Idle state.

Following this, with the state machine still in State A, the user moves his hand such that the actual user input state 225 changes (by rotating it counter clockwise from his perspective). Whilst this change is detected by the recognition engine 225, the new state—in which the user's index finger is to the left of the thumb—does not match any of the expected user input states of the state machine, i.e. it does not match State A (as this requires the index finger above the thumb) nor does it match State B (as this requires the index finger to the right of the thumb). As such, this is not a triggering event for the Rotate Right gesture state machine, i.e. it does not cause that state machine to change state, therefore it is not depicted on the timeline 302 for the Rotate Right gesture. Furthermore, if the user input 211 is not satisfying State A or State B for too long (e.g. more than about 500 milliseconds) the gesture state machine reverts back to Idle, as represented in the third picture down in FIG. 3. This is done to avoid false detection that do not originate from user intent to perform the gesture but random poses that happen to satisfy the states. A short grace interval (e.g. 500 ms) may be provided to avoid too harsh strictness on the user's movement rapidness from state A to state B (and to overcome detection errors) and false resetting. The idea behind is that it is not the user intent to do A→B if he did A→C→A→B, so performance of the latter should not trigger an action mapped to the former.

Next, the user rotates his hand back, such that the index finger is above the thumb again. Again this is registered by the recognition engine 224, and because a transition from Idle to state A is permitted, an icon representing the transition to state A is added.

Finally, from this position—and with the Rotate Right state machine still in State A—the user rotates his hand clockwise (from his perspective). As a consequence, his index finger is now to the right of his thumb. This is detected by the recognition engine 224, and as such the actual user input state 225 now matches State B. And because the transition from State A to State B is permitted, this is a triggering event that causes the executed Rotate Right state machine to change to State B, which in turn causes a representation of State B to be added to the Rotate Right timeline 302 after State A.

As shown, different icons may be used to represent non-accepting states (such as State A) and accepting states (such as State B) so that they can be distinguished.

The above is a relatively simple example provided to illustrate the basic operation of the tool 200. Somewhat more complex example use cases will be described below, to show how the tool 200 can be used in such cases.

Additional complexity can arise for a number of reasons.

Firstly a piece of code 212 can embody multiple state machines, each defining a different gesture. The states of these may overlap, in that a single change in the user input 211 can cause two or more of these state machines to change state when they are executed in parallel. With this particular situation in mind, respective timelines can displayed on the UI for different state machines embodied in the code. That is, a separate timeline for each gesture state machine. An identifier of each gesture state machine is displayed in association with its timeline, so that the user can see which actions are triggering which gesture state machines.

Secondly, in contrast to the simple Rotate Right gesture state machine of FIG. 1B for which there are only two states and two possible paths through the state machine, i.e. 'Idle to State A and back to Idle' and 'Idle to State A to State B', and only one accepting state, a more complex state machine can have more states, with possibly multiple accepting states, and more complex arrangements of permitted transitions.

Figure 4:
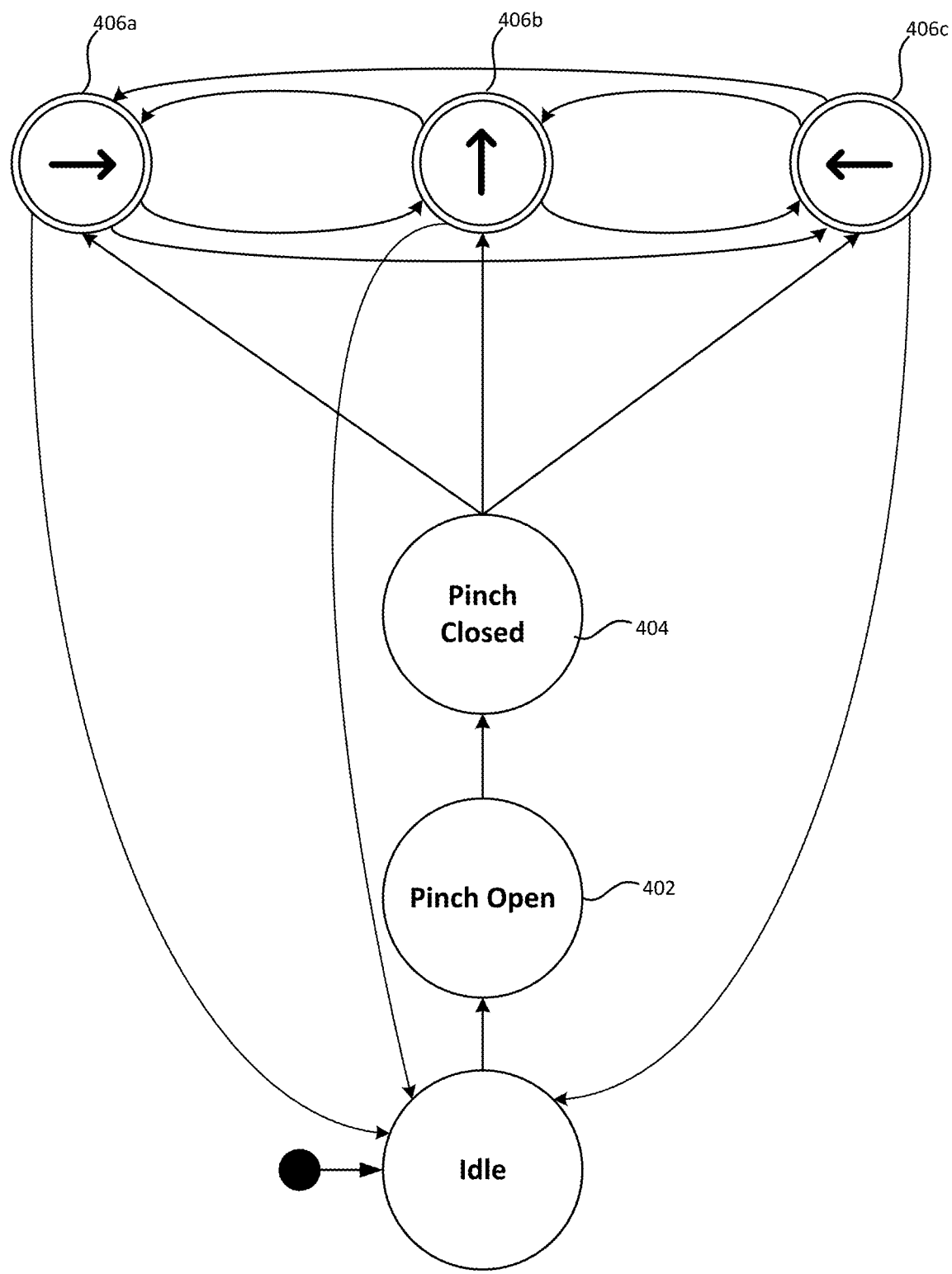
FIG. 4 shows a state machine defining a "Pinch and Move" gesture.

By way of example, FIG. 4 shows an example of a state machine defining a "Pinch and Move" gesture. The user performs the Pinch and Move gesture by moving his hand from an open pinch pose—thereby actualizing an Pinch Open state 402 of the state machine, which requires that the index finger is not touching the thumb and which may have other constraints if desired—to a closed hand pose—thereby actualizing a Closed Hand state 404 of the state machine, which is a child of the Open Hand state 402 and which requires at least that the index finger is touching the thumb. In context, this may for example allow a user to "grab" a displayed object with his fingers, by making a pinching motion with his index and thumb.

Where the complexity arises is that, having grabbed the object, the user can not only move it up, right or to the left—corresponding to motion states 406a, 406b, 406c—but can do so in any desired combination, e.g. up then left, then up again; left, then right, then up, then left again etc. Each of the motion states 406a-406c is an accepting state, where the application function that is triggered by entering those states is the movement of the displayed object left, up and right respectively. Accordingly, not only are transitions from Closed Hand 404 to any one of the motion states 406a-c permitted, but transitions from any one of the motion states to any other of the motion states are also permitted.

Note: because motions states 406a-c are accepting states, these states are shown as pointing back to Idle in FIG. 4, as that denotes they are accepting states (see above).

In this case, it is very useful for the debugging user to be able to see on a timeline for the Grab and Move gesture which state changes are being triggered in practice, and whether the code is behaving as expected in this respect, as there are many (indeed infinitely many) different sequences of user input states that can be actualized according to the permitted transitions.

An example of how the tool 200 can be used to identify and correct an error in a piece of code will now be described with reference to FIGS. 5A-5E.

The code defines a "Rotate Right/Left" gesture, which is similar to the Rotate Right gesture, however the user now also has the option of rotating in the opposite direction. Accordingly, in addition to Idle, the intended state machine 502 has three states: Lock Object Pose 504, equivalent to State A in FIG. 1B (requiring the user's index above the thumb); Rotate Object Right Pose 506, equivalent to state B in FIG. 1B (requiring the user's index to the right of the thumb); and Rotate Object Left Pose 508, an additional state requiring the user's index to be to the left of the thumb. From Idle, only a transition to Lock Object Pose 504 is permitted; from Lock Object Pose 504, the intention is for transitions to either Rotate Object Right 506 or Rotate Object Left 508 to be permitted (to capture rotation in either direction), and from also from each of those states 506, 508 back to Lock Object Pose 504 (to capture reverse rotation). From any of states 504, 506, 508, transitions back to Idle are permitted, for example this may occur if no other transition is detected within a time limit and may trigger an application function.

Figure 5A:
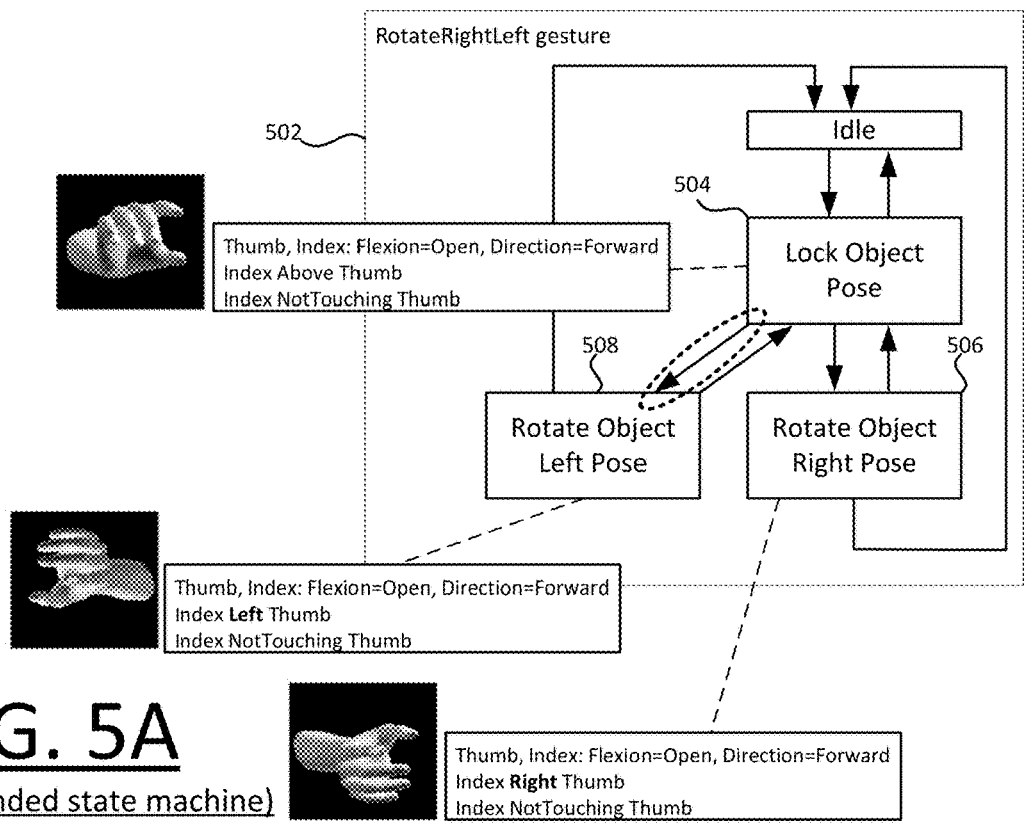
FIG. 5A shows an example of an intended state machine for a "Rotate Right/Left" gesture and FIG. 5B shows an example of how that state machine might be coded erroneously by a developer.
Figure 5B:
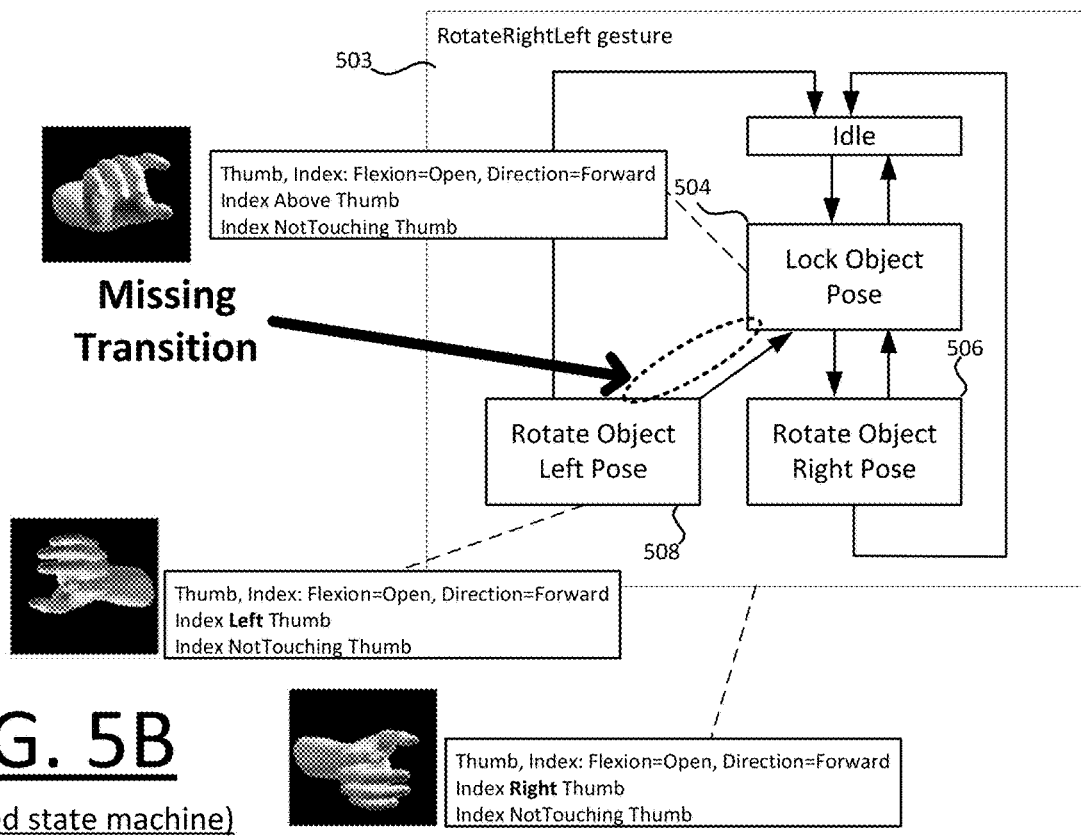

However, although this is what is intended, the state machine that is actually embodied in the code 212 is shown in FIG. 5B (labelled 503, and corresponding to FSM in FIG. 2): the intended transition from Lock Object Pose 504 to Rotate Object Left 508 is missing from the actual state machine 503, because the developer has forgotten to declare this transition in the code. Otherwise the state machine is coded as intended.

As a consequence, when the debugging process is applied to the code to show a timeline for the Rotate Right/Left gesture (522, FIGS. 5C-E), the debugging user will see that the code is behaving as expected some of the time. In particular, because the states Lock Object Pose 504 and Rotate Object Right Pose 506, and the transitions between them, have been correctly defined, as the user rotates his hand clockwise to move between these states, this will trigger a state change from Lock Object Pose 504 to Rotate Object Right Pose 506, which is represented on the Rotate Right/Left timeline 522 as expected (see FIG. 5C).

However, when the user rotates his hand in the other direction (FIG. 5D), he can see that, although the initial transition from Idle to Lock Object Pose 504 is occurring as expected, the state machine 503 is not transitioning to Rotate Object Left Pose 508 as it should be; rather the state machine is transitioning back to Idle instead, because the actual user input state does not match any child state of Lock Object Pose 504 due to the missing state machine transition.

Figure 5E:
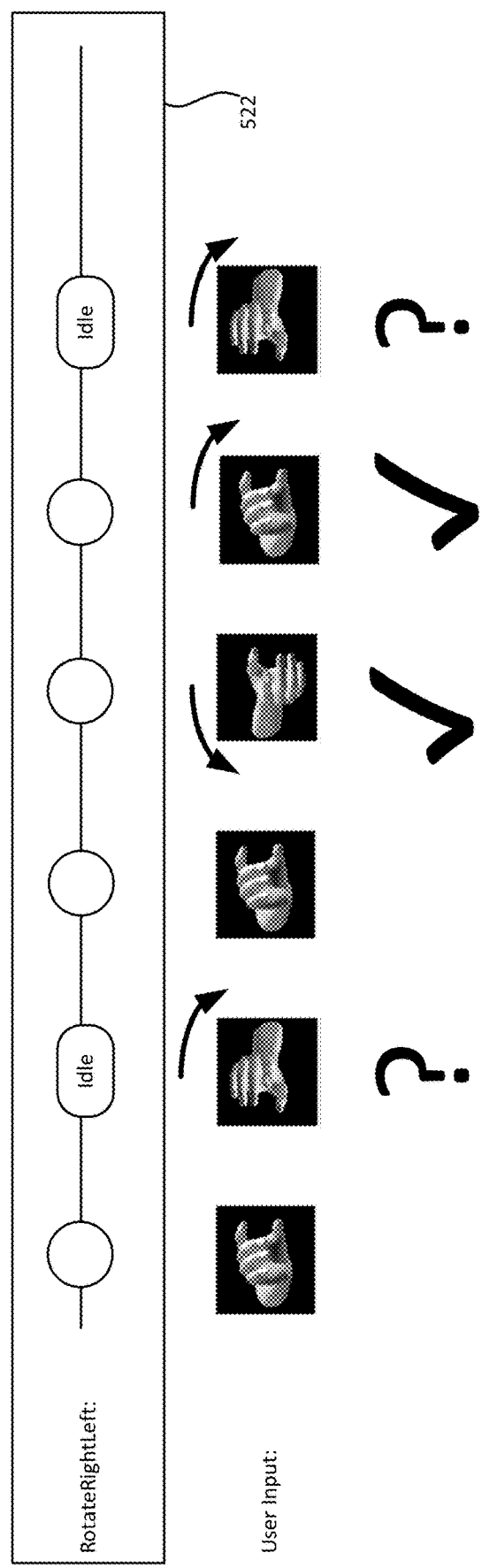

As shown in FIG. 5E, by rotating his hand back and forth, the user can essentially map out the response of the coded state machine on the timeline. From this, it becomes evident that there is a problem with the code that relates to the Rotate Object Left Pose. The developer therefore knows where to look for the problem in the code, and will soon be able to spot the missing transition.

Figure 6A:
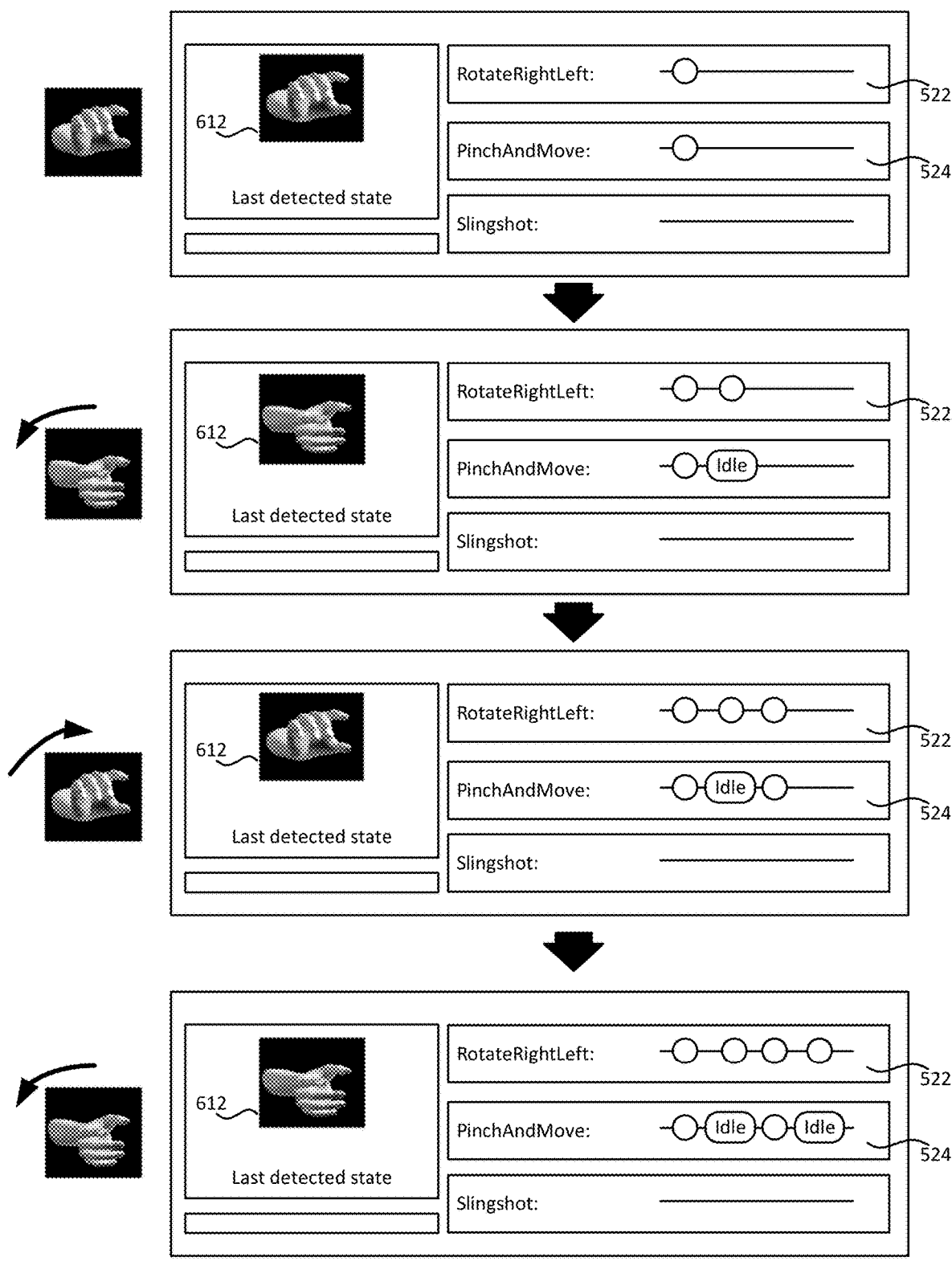
FIGS. 6A-C show examples of additional information that can be displayed on the user interface to assist with the debugging process.
Figure 6B:
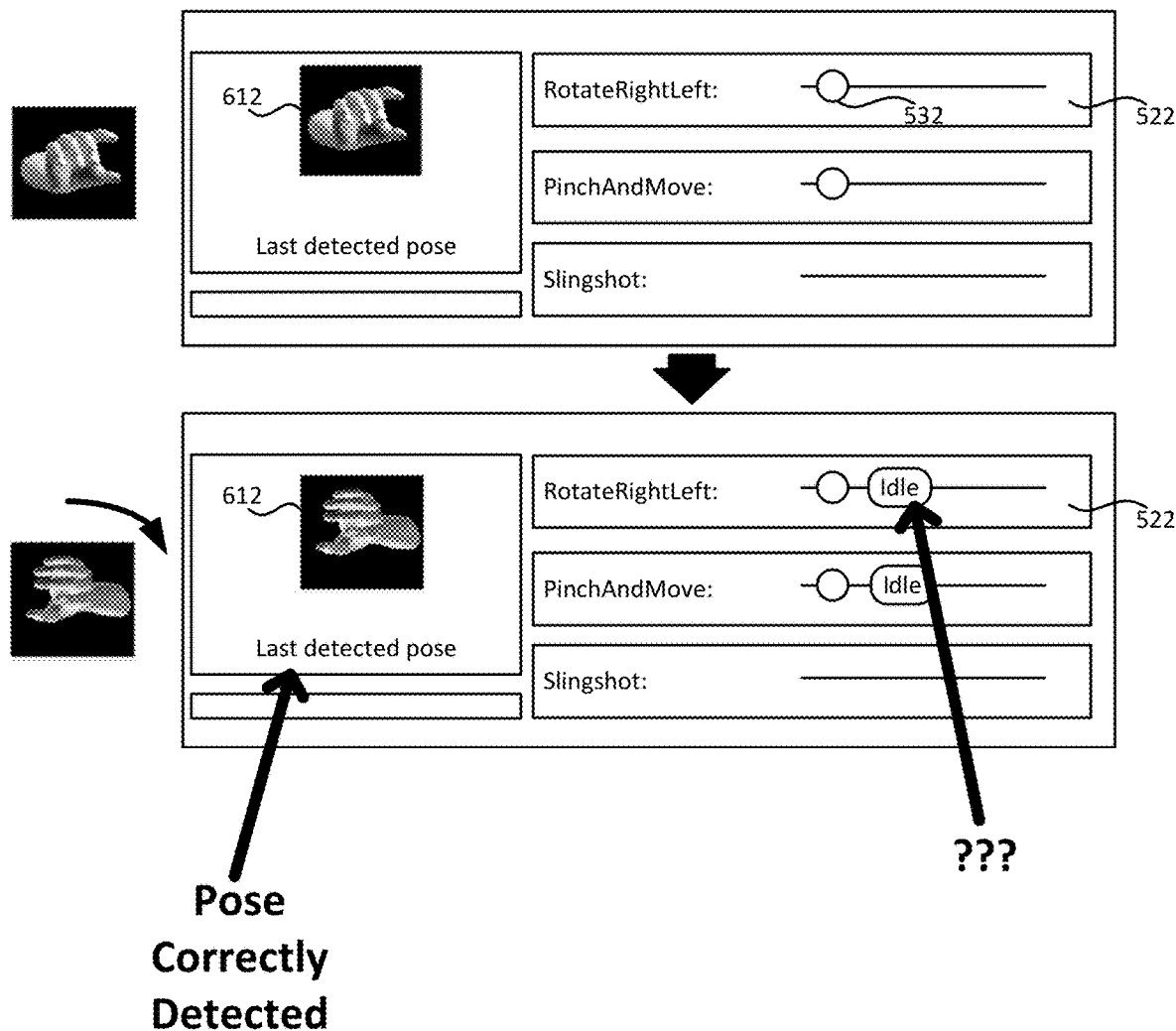

As shown in FIGS. 6A and 6B, to further assist the developer, preferably information about the most recently detected actual user input state 225, as recognized by the recognition engine 224, is displayed in addition to the timeline(s). In FIGS. 6A-6B, this information is in the form of a graphical representation 612 of the actual user input state 225 displayed in an area of the display 208 separate from a set of timelines that is displayed for a set of gestures, namely "Rotate Right/Left", "Pinch and Move" and "Slingshot". Alternatively or in addition, the displayed information about the actual user input state 225 could comprise a description of the actual user input state 225, for example an indication of which of the basic propositions are currently satisfied by the user input 211.

Following the example of the Rotate Right/Left gesture with the missing state machine transition, as can be seen in FIG. 6A, for the parts of the state machine that are defined correctly, the developer can see that both the code 212 and the recognition engine 2254 are behaving as expected: from the displayed information 612, he can see that the recognition engine 224 is recognising the constituent poses correctly as he rotates his hand to the right, and from the Rotate Right/Left timeline 522 he can see that the Rotate Right/Left state machine is transitioning as expected.

However, turning to FIG. 6B, as he rotates his hand to the left, as before, he see that states are not being added to the Rotate Right/Left 522; however, he can also see from the displayed information 612 that the pose changes are being correctly recognized by the recognition engine 224. From this, he can see that the recognition engine 224 is operating as expected, and infer from the absence of the expected state icons on the timeline (and the unexpected reversions to Idle) that the error must therefore be with the code 212.

FIGS. 6A and 6B also illustrate another property of the UI mentioned above, namely the simultaneously displaying of multiple timelines for different gestures—three in this case ("Rotate Right/Left", "Pinch and Move", and "Slingshot"), though this is purely an example.

It can be seen that the initial pose made by the user matches both state 402 of the Pinch and Move gesture state machine (FIG. 4) and state 504 of the Rotate Left/Right state machine (503, FIG. 5B). Because both state machines permit a transition to these respective states from Idle, this causes both of the state machines, which are executed in parallel by the executor 220, to transition to state 402 and 504 respectively. Both of these transitions are represented on the UI, on the timelines 522 and 524 for "Rotate Right/Left" and "Pinch and Move" respectively. As the user continues to make hand motions, however, this does not cause further transitions of the Pinch and Move state machine, therefore defaults back to Idle in response, also represented on the Pinch and Move timeline 524 (third picture down in FIG. 6A).

Figure 6C:
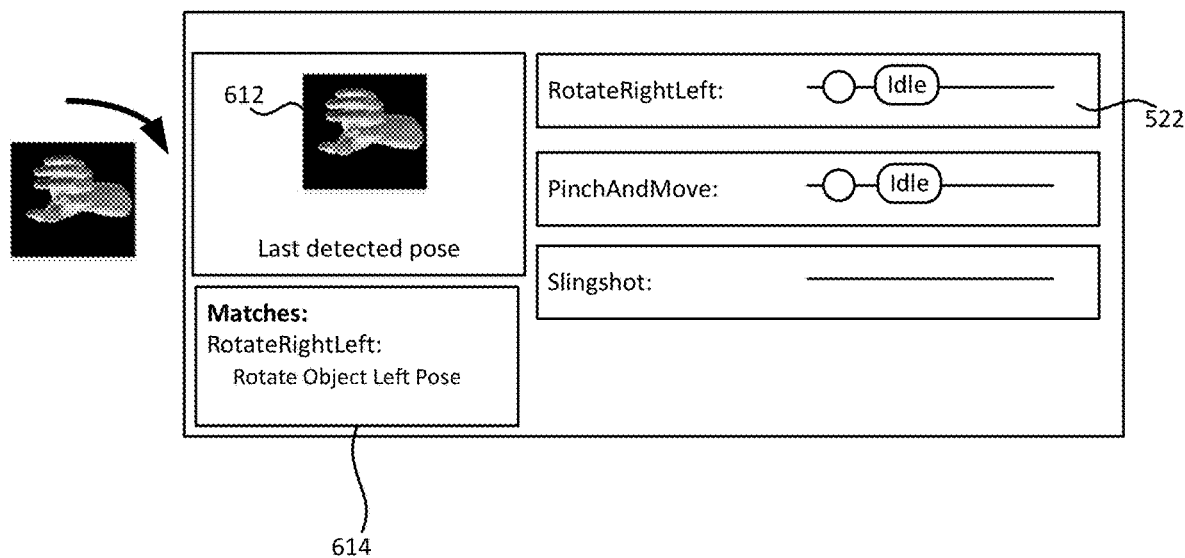

As noted, when the actual user input state 225 is determined to match a state of (one of) the state machine(s) being debugged, but the matching state is not a child of the current state of that state machine, then the state machine reverts to Idle by default, which is depicted on the timeline; however, in some implementations, the match may be explicitly indicated to the user on the UI, for example by displaying an identifier (e.g. name) of the matching state, which may be displayed along with an identifier of the state machine it forms part of. This can be helpful for the user in determining whether code is behaving unexpectedly because of an error in the way the states of the state machine are defined or because of an error in the way the transitions are defined. With reference to FIG. 6C, following the Rotate Right/Left example, this shows how, following a rotation of the user's hand to the left, a match is detected between the actual user input state 225 and the State Object Left Pose state (508, FIG. 5B). An indication of this match 614 is displayed to the user, hence the user can see that state 504 is defined in the code as intended, and that the problem must therefore be a missing transition in the code. Conversely, were the state defined incorrectly, he could infer from the absence of any match at this stage that the problem is with the state definition, i.e. that the constraints for that state are defined incorrectly in the code.

Figure 7:
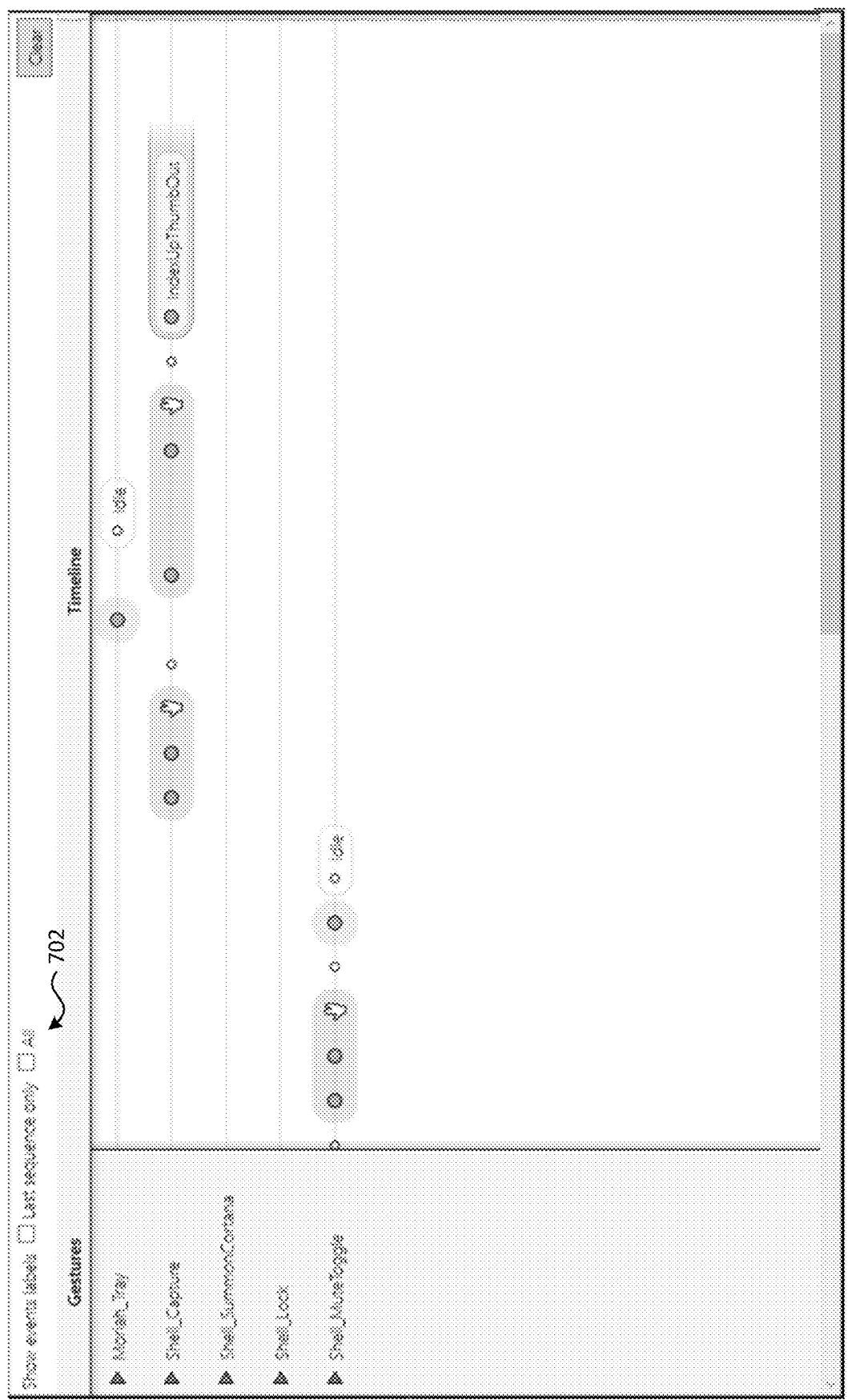
FIG. 7 shows another example of a timeline user interface.

FIG. 7 shown another example of a possible timeline interface, in which timelines are shown for multiple gestures simultaneously. For at least one of the state icons displayed on one of the timelines, an identifier, such as a name, of the state is displayed for the benefit of the user. One or more selectable options are displayed, which the user can select to choose the level of detail that is provided on the timelines. In particular, the user can select to have the state names displayed for only certain icons (e.g. the most recent icon, most recent detected sequence etc.), or to have names displayed for all icons.

The icons displayed on the timeline may be selectable, for example by clicking an icon or simply hovering the cursor over an icon, to obtain further information about those states. That is, the UI may also be configured to that the user can select any of the expected user input states as a target state, to obtain additional information about the target state, or the user may be able to navigate through the UI to select a target state in some other manner.

For example, in the case that a target state was not achieved (though the user provided the correct input), the UI shows the discrepancies between the target state constraints and what the detector detected (per such constraint), thereby conveying why the overall satisfaction of the target state failed. For example, each constraint may be one of the basic propositions referred to above.

Figure 8:
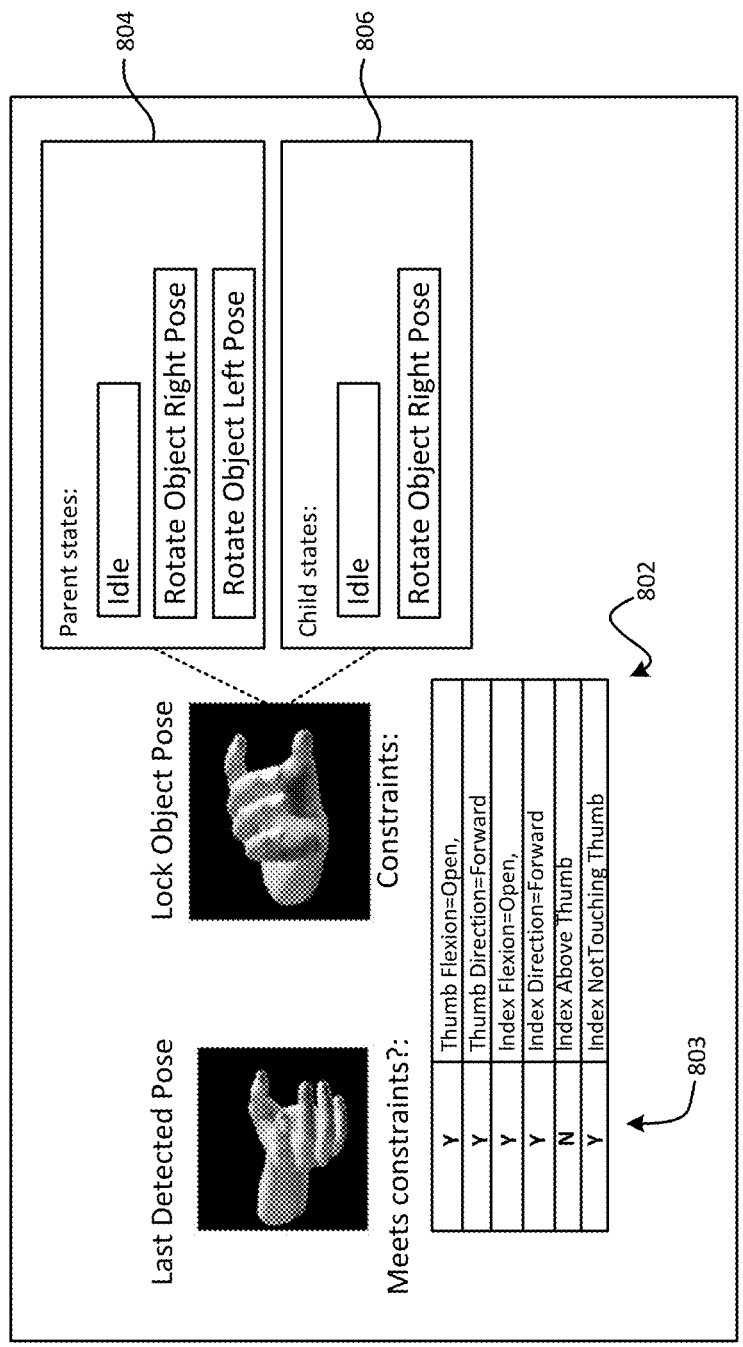
FIG. 8 shows additional information that may be displayed on the user interface for a target state.
Figure 8:
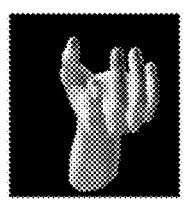

A first example is shown in FIG. 8, in which the user has selected the Lock Object Pose state 504 as a target state. An indication 803 of each of the target constraints for the target state is shown (six in in this example), together with an indication 803 of whether each of those constraints it met. In this example, all but the "index above thumb" constraint is met, because the index of the user's hand is to the right of the thumb, as shown to the left of the page.

In this example, information about any parents and children of the target state is also displayed via the UI, denoted 804 and 806 respectively. This information identifies each of the parents (if any) and each of the children (if any) for the target state. This is helpful for the user in identifying missing or erroneous transitions: for example, in this case, he can see that, whilst the Rotate Object Left Pose is shown as a parent of Lock Object Pose, it is not shown as a child. From this, he can conclude that the state machine is missing the transition from Rotate Object Left Pose 508 to Lock Object Pose 504.

As noted, to navigate to the more detailed interface of FIG. 8, the icon representing one of the states on a timeline may be selectable, for example by clicking on that icon or selecting it on a touchscreen, to select that state as the target state and render the more detailed interface of FIG. 8. That is, each of the icons on the timeline may be selectable to obtain details of the state it represent, which can be displayed in the interface of FIG. 8.

Together with the timeline interface, this provides an intuitive way for the developer to isolate problems. For example, following the example of FIG. 6B, having seen that the timeline is not updating as expected following the detection of the Lock Object Pose state, he can select the icon 532 representing that state on the timeline in order to navigate to the interface of FIG. 8. From here, he can quickly see that the transition is missing from child information 806.

Figure 9:
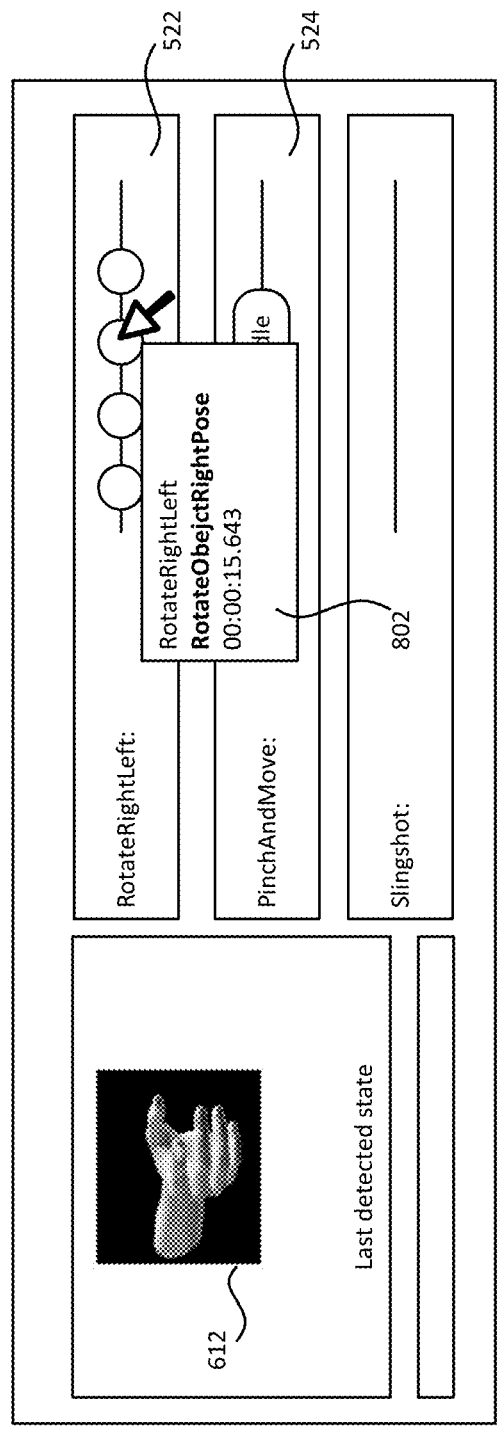
FIG. 9 shows another example of additional information that may be displayed on the user interface for a state represented on a timeline.
Figure 9:
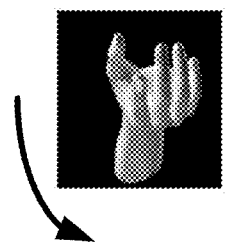

FIG. 9 shows a second example of how additional information may be displayed about detected states. In this example, when one of the timeline icons is selected by hovering a cursor over that icon (without clicking it), related information 802 is displayed in response. The related information 802 comprises at least one of: an identifier of the state machine, an identifier of the state of that state machine that is represented by the icon, and a time at which the transition to that state occurred, i.e. the time of the transition represented by the icon.

As will be appreciated, these are just examples—there are other ways in which a UI may be navigable to select target states which the user wishes to obtain additional information about.

It is noted that, whilst the above has been described in relation to the detection of free-space gestures using image capture device(s), the invention is not limited in this respect. For example, motion sensor(s), such as gyroscopes, accelerometers etc. may be used in instead of or in addition to the image capture device(s). In this case, a function of the recognition engine is to characterize motion detected using such sensors in similar terms.

Moreover, the same techniques can be applied to gestures on a touch screen, including multi-touch gestures. In this scenario, the function of the recognition engine is to characterize the on-screen gestures in a similar manner, for example in qualitative natural language terms. As will be appreciated, the above described techniques in which poses and motion are characterized using combinations of basic propositions can be readily applied to on-screen gestures, to create (say) complex multi-touch gestures as desired that can be accurately detected.

What is more, the present invention is not limited to gestures, and can be applied generally to any system in which user input actions are defined as state machines driven by changing user input. For example, the techniques could also be applied to voice recognition, where the states correspond to particular words, such that a user has to speak a specific words in a specific order to reach an accepting state.

Regarding terminology, "actualizing" an expected user input state of a state machine means changing the user input 211 such that it matches the expected user input state. Actualizing a sequence of the expected user input states according to the permitted transitions means actualizing those expected user input states in an order that causes the state machine to transition between those states, noting that generally only certain transitions between states are permitted, which in turn restricts the order in which states can be actualized whilst still causing state machine transitions.

The computer readable debugging instructions that are executed to implement the functionality of the debugging tool 200 can be stored in one or more computer readable memory devices. The features of the techniques described above are platform-independent, meaning that the techniques may be implemented on a variety of commercial computing platforms having a variety of processors. For example, the debugging tool 200 may also include an entity (e.g. software) that causes hardware of the debugging tool 200 to perform operations, e.g., processors functional blocks, and so on. For example, the tool may include a computer-readable medium that may be configured to maintain instructions that cause the tool, and more particularly the operating system and associated hardware of the tool to perform operations. Thus, the instructions function to configure the operating system and associated hardware to perform the operations and in this way result in transformation of the operating system and associated hardware to perform functions. The instructions may be provided by the computer-readable medium to the tool through a variety of different configurations. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A debugging tool comprising:
user input apparatus configured to receive user input from a debugging user;
computer storage configured to hold a piece of code to be debugged, the code embodying a state machine defining a gesture as a user input action, wherein the state machine has a set of expected user input states for the user input action and a set of child states that are permitted to transition from a corresponding one of the set of expected user input states, whereby the user input action is performed by a user actualizing a sequence of the expected user input states and at least one of the set of child states;
a display configured to display a timeline; and
at least one processor configured to execute an iterative debugging process for visualising behaviour of the code on the timeline, the debugging process being driven by changes in the user input received at the user input apparatus;
wherein an initial iteration of the debugging process is performed for a starting state of the expected user input states as follows:
identifying one of the expected user input states as a target state;
identifying at least one child state for the target state, comparing the user input to the at least one child state for the target state, and
when a match between the user input and the at least one child state is not detected, adding a visual representing between a transition from the target state to a state of the user input; and
when a match between the user input and the at least one child state is detected: controlling the display to add a visual representation of the matching state to the displayed timeline, and performing a further iteration of the debugging process for the matching state, thereby representing on the timeline a sequence of the expected user input states as they are actualized by the debugging user.

2. A debugging tool according to claim 1, wherein the code embodies multiple state machines each defining a different user input action, wherein respective timelines are displayed for each of the user input actions and the debugging process is performed for each of the user input actions simultaneously, whereby one change in the user input can cause visual state representations to be added to multiple timelines.

3. A debugging tool according to claim 2, wherein an identifier of each of the user input actions is displayed in association with the timeline displayed for that user input action.

4. A debugging tool according to claim 1, wherein at least one of the user input states of the state machine is an accepting state, the user input action being completed by reaching an accepting state, wherein the visual representation of the accepting state marks it as an accepting state.

5. A debugging tool according to claim 1, wherein the processor is configured to control the display to indicate to the user a detected change in the user input even if the changed user input does not match one of the expected user input states of the state machine.

6. A debugging tool according to claim 5, wherein the processor is configured to control the display indicate to the user the most recently detected state by displaying information about the most recently detected state in an area of the display separate from the timeline.

7. A debugging tool according to claim 6 wherein the information comprises a description of the most recently detected state and/or a visual representation of the most recently detected state.

8. A debugging tool according to claim 5, wherein if the processor detects a match between the changed user input and any one of the expected states but there is no transition that is permitted to that state from the user input state for which a current iteration of the debugging process is being performed, such that no visual representation of the matching state is added to the timeline in response to the change in the user input, the processor is configured indicate the detected match to the user in an area of the display separate from the timeline, whereby the user can see the match has been detected and infer the absence of any such transition that is permitted from the absence of any such visual representation of the matching state on the timeline.

9. A debugging tool according to claim 5, wherein a representation of an idle state of the state machine is added to the timeline in response to the change in the user input.

10. A debugging tool according to claim 1, wherein the starting state is an idle state, and the state machine is configured to return to the idle state from any of the user input states if no state change occurs within a time limit or if the user input changes in a way that does not match any expected user input state to which transitions are permitted from the user input state for which a current iteration of the debugging process is being performed;
   wherein if no match detected at step 3) within the time limit, a visual representation of the idle state is added to the timeline to convey the return to the idle state.

11. A debugging tool according to claim 1, wherein the processor is configured to display, for a target one of the expected user input states:
   an indication of one or more constraints that must be met by the user input to match that state together with an indication of whether those constrains are currently met by the user input, and/or
   information about any of the expected user input states to which transitions are permitted from the target state, and/or
   information about any of the expected user input states from which transition are permitted to the target state.

12. A debugging tool according to claim 11, wherein the processor is configured to receive an input from the user to select the target state.

13. A debugging tool according to claim 12, wherein at least one of the visual representations on the timeline is selectable to select, as the target state, the state it represents.

14. A debugging tool according to claim 1, further comprising a timeline-based visual component that depicts a transition between states to enable a user so see events along a timeline in reference to other gestures.

15. A debugging tool according to claim 14, wherein the events are symbolized by different iconic images to depict different modality types of the events.

16. A debugging tool according to claim 1, wherein the user input action is a gesture.

17. A debugging tool according to claim 16, wherein each of the expected user input states corresponds to a hand pose or hand motion.

18. A method comprising using the debugging tool of claim 1 to identify an error in a piece of code, and modifying the code to correct the error.

19. A method according to claim 18, further comprising:
   a step of incorporating the modified code in an executable application, in which the user input action is associated with an application function, wherein the user input action, when performed, causes the application to perform the application function at runtime, or
   a step of executing the state machine embodied by the modified code, wherein the executed state machine causes an application function to be performed upon reaching an accepting state of the executed state machine.

20. A computer program product for debugging a piece of code, the computer program product comprising computer readable instructions stored on a computer readable storage medium and configured to cause a processor to execute an iterative debugging process for visualising behaviour of the code on a timeline, the debugging process being driven by changes in a user input received at user input apparatus;
   wherein the code embodies a state machine defining a gesture as a user input action, wherein the state machine has a set of expected user input states for the user input action and a set of child states that are permitted to transition from a corresponding one of the set of expected user input states, whereby the user input action is performed by a user actualizing a sequence of the expected user input states and at least one of the set of child states;
   wherein an initial iteration of the debugging process is performed for a starting state of the expected user input states as follows:
   identifying one of the expected user input states as a target state;
   identifying at least one child state for the target state,
   comparing the user input to the at least one child state for the target state,
   when a match between the user input and the at least one child state is not detected, adding a visual representing of an error between a transition from the target state to a state of the user input; and
   when a match between the user input and the at least one child state is detected: controlling a display to add a visual representation of the matching state to a timeline displayed by the display, and performing a further iteration of the debugging process for the matching state, thereby representing on the timeline a sequence of the expected user input states as they are actualized by the debugging.

* * * * *